United States Patent [19]
Taguchi

[11] 3,798,661
[45] Mar. 19, 1974

[54] AUTOMATIC DIAPHRAGM CONTROL DEVICE FOR A CAMERA

[75] Inventor: Tetsuya Taguchi, Kanagawa, Japan

[73] Assignee: Canon Kabushiki Kaisha, Tokyo, Japan

[22] Filed: Aug. 29, 1972

[21] Appl. No.: 284,604

[30] Foreign Application Priority Data
Aug. 26, 1971 Japan.................. 46-65426

[52] U.S. Cl. .................................. 95/10 CD
[51] Int. Cl. ................................. G03b 7/08
[58] Field of Search .................. 95/10 CD

[56] References Cited
UNITED STATES PATENTS
3,466,447  9/1969  Fahlenberg ............... 95/10
3,482,497  12/1969  Ernisse .................... 95/10

Primary Examiner—Samuel S. Matthews
Assistant Examiner—Michael L. Gellner
Attorney, Agent, or Firm—Toren, McGeady and Stanger

[57] ABSTRACT

In the device disclosed, a mechanism while it is changing the aperture value of a diaphragm from a starting value, also opens and closes switching means a number of times equal to the extent to which the diaphragm is being changed. Suitable circuit means accumulate signals corresponding to the number of times the switching means is closed. A comparator compares the resulting stored value of the accumulated signals with a reference voltage that corresponds to photographic information such as the output of a light measuring photoresistor. When the accumulated stored value reaches the measured reference voltage, stopping means stop the aperture reducing operation.

9 Claims, 6 Drawing Figures

AUTOMATIC DIAPHRAGM CONTROL DEVICE FOR A CAMERA

The present invention relates to an automatic diaphragm control device for a camera. Further in detail the present invention relates to an automatic diaphragm control device for a camera having a means to generate a voltage signal which varies stepwise, corresponding to the change in the diaphragm value of a diaphragm device with its diaphragm value gradually changing as time passes.

In a conventional type of an automatic diaphragm control device of a camera, diaphragm value is decided by comparing the voltage signal which varies linearly corresponding to the change of the diaphragm value of a diaphragm device with its diaphragm value gradually changing as time passes, and voltage signal which corresponds to other photographing information such as amount of light of an object, amount of light of shutter release, etc.

However, such automatic diaphragm control device has a shortcoming that the function of a comparator becomes unstable near reference voltage since said device compares the voltage signal which changes linearly corresponding to the variation of the diaphragm value, with the reference voltage.

The object of the present invention is to provide an automatic diaphragm control device for a camera in which the above mentioned shortcoming is eliminated.

The object of the present invention is to provide an automatic diaphragm control device for a camera having a means to generate a voltage signal which changes stepwise corresponding to the variation in the diaphragm value of the diaphragm device with its diaphragm value gradually changing as time passes.

The present invention will be described in reference to the attached drawings.

Figure 1:
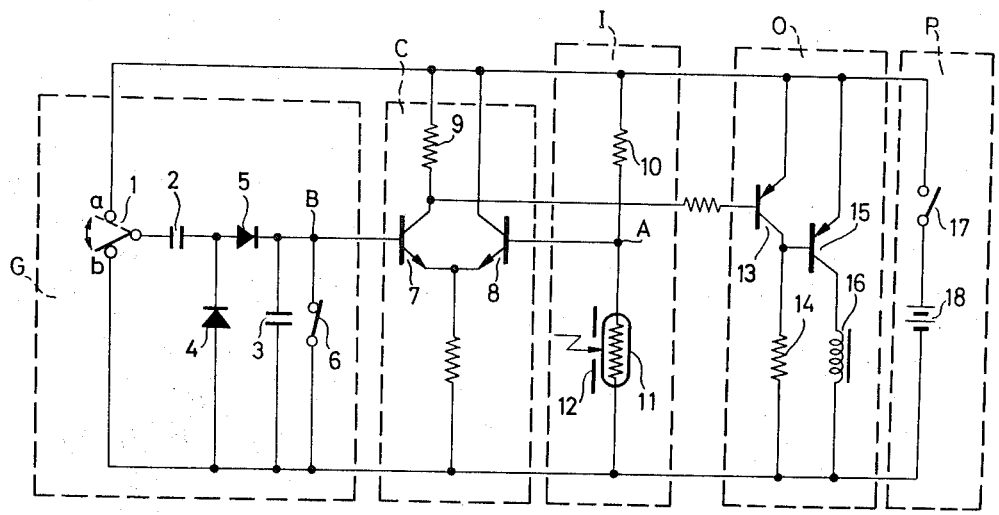
FIG. 1 is a circuit diagram showing an example of a diaphragm control circuit of the automatic diaphragm control device of the present invention.

In FIG. 1, G shows a part generating such voltage as changing stepwise corresponding to the diaphragm value of a diaphragm device with its stop-down diameter changing as time passes. C is a comparator with its one input end being connected with the output terminal of the above mentioned voltage generating part. I is a part generating such voltage as corresponding to photographing information such as amount of light of an object, film sensitivity and shutter speed, etc., wherein the generated voltage is impressed on the other input terminal of the above mentioned comparator C. O is an output part to stop the diaphragm device (FIG. 3) by the output of the comparator. P is a power source part. Now, the arrangement of the voltage generating part G shall be explained.

1 is a switching device which can be changed over to a contact a or a contact b. Said change over of the switching device is made for a certain number of times as determined by the variation in the diameter of the diaphragm device shown in FIG. 3 which is to be explained later.

That is, it is so arranged that said change over is so made corresponding to the variation in stop-down diameter that when the variation in the stop-down diameter is small, the number of said change over is small while when said variation is large the change over is made more frequently. 2 and 3 are capacitors which are charged by the power source part P when the change over switch 1 is connected to the contact a. 4 and 5 are diodes. The diode 4 enables the capacitor 3 to be charged and when the switch 1 is connected to the contact b, it enables the capacitor 2 to be discharged. The diode 5 is to prevent discharging of the capacitor 3 when the switch 1 is connected to the contact b. 6 is a switch provided in parallel with the capacitor 3, and it may be so arranged that it is closed ordinarily, but is opened at the same time as the automatic diaphragm device starts working. The parts 1 to 6 are already known as an accumulation counter. 7, 8 are transistors composing the comparator C. The terminal voltage B of the capacitor 3 is impressed on the base of the transistor 7. 9 is a resistor. 10, 11 are resistors composing a bleeder circuit I, and photographing information is set on said resistors. For example, such photographing information as film sensitivity, shutter time, etc. is set by the diaphragm device provided in front of a photo-resisting element 11. The voltage at the point A in the bleeder circuit I is impressed on the base of the transistor 8 of the above mentioned comparator C. The output of the comparator C is transmitted to a magnet 16 through transistors 13, 15. Said magnet 16 is to stop function of the automatic diaphragm device (FIG. 3). 14 is a resistor. 17 is a power source switch which is closed before the automatic diaphragm device functions. This switch 17 may be so arranged that it is closed by first step pressing down of a shutter release bar. 18 is a power source.

Figure 3:
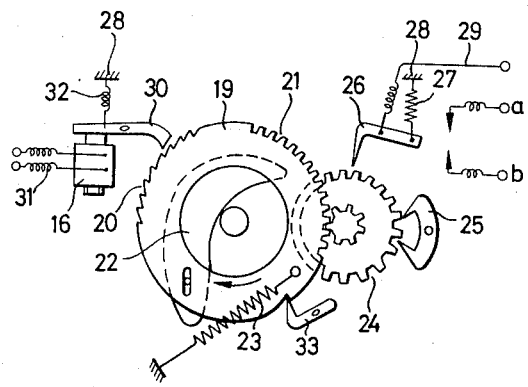
FIG. 3 is a drawing to show a diaphragm device which collaborates with the circuit shown in FIG. 1.
Figure 4:
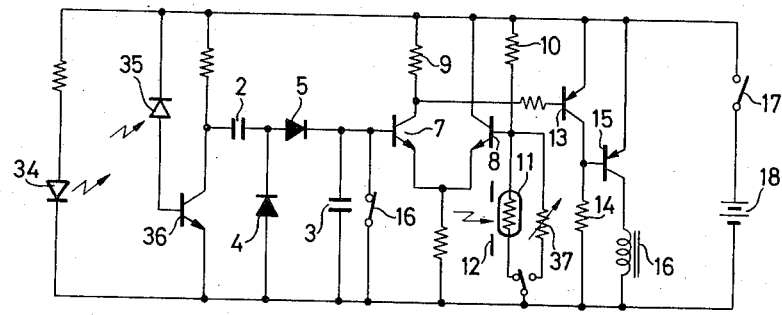
FIG. 4 is a circuit diagram showing a second example of the present invention.

Next, FIG. 3 shall be explained.

19 is a stop-down ring. On the outer circumference of said ring 19, ratchet teeth 20 and gear teeth 21 are provided. 22 is an iris blade which forms a stop-down diameter by rotation of the stop-down ring 19. 23 is a spring which rotates the stop-down ring 19 to counter clockwise direction. 24 is a gear which works in association with the gear 21 of the stop-down ring 19. 25 is an anchor which engages with the gear 24. 26 is a detecting member which detects the rotation of the gear 24 and reciprocates between the contacts a and b of the switch 1. 27 is a spring provided between the detecting member 26 and a fixed part 28. 29 is a connecting wire which is connected to the capacitor 2 of FIG. 1. 30 is a stopper which engages with the ratchet teeth 20 and stops rotation of the stop-down ring 19. Said stopper 30 is controlled by the magnet 16 shown in FIG. 1. 31 is a connecting wire to the magnet 16. 32 is a spring provided between the stopper 30 and the fixed part 28. 33 is a releasing member which starts the rotation of the stop-down ring 19. This releasing member 33 may be so composed that it is activated by the second step pressing down of the shutter release bar.

Figure 2:
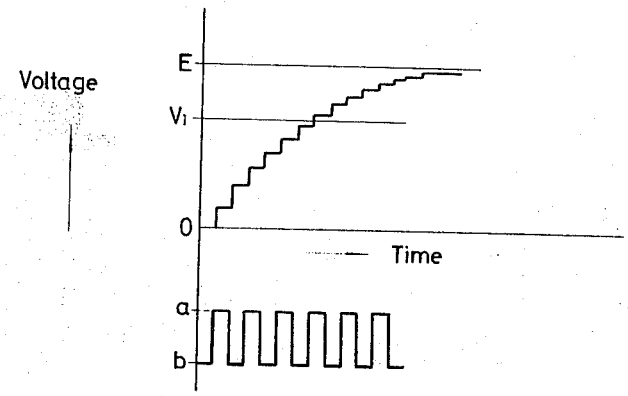
FIG. 2 is a drawing to show variation in the electric potential at the point B in the circuit of FIG. 1.

Now the function of the first example shall be explained referring to FIG. 1 through FIG. 3. This explanation shall be made in connection with the function of the shutter release bar.

The power source switch 17 is closed by the first step pressing down of the shutter release bar (not shown in the drawing). The releasing member 33 is rotated in a counterclockwise direction by the second step pressing down of the shutter release bar to initiate the rotation of the stop-down ring 19. The stop-down diameter is gradually changed to opening direction by said rotation. The short-circuiting switch 6 is opened by the rotation of said stop-down ring 19 or by the rotation of the releasing member 33. The gear 24 is also rotated in association with the rotation of the stop-down ring 19. By the rotation of the gear 24 the detecting member 26 is changed over from the contact a to the contact b. The number of said change over varies depending on the amount of the rotation of the stop-down ring 19, that is the amount of variation in the stop-down diameter. When the switch 1 is connected to the contact a, the capacitors 2, 3 are charged. Next by the rotation of the gear 24 the switch 1 is changed over from the contact b to the contact a, and the capacitor 2 is discharged. However, the capacitor 3 is prevented from discharging by the diode 5. As mentioned above by the rotation of the stop-down ring 19 the charging voltage of the capacitor 3 goes up stepwise as shown in FIG. 2. The ordinate of FIG. 2 shows the terminal voltage of the capacitor while abscissa shows time. E shows full charge value of the capacitor 2, and $V_1$ shows the voltage of the point A of the bleeder circuit I. The wave form shown in the lower part shows connection of the contacts a and b of the switch 1.

When the terminal voltage of the capacitor 3 reaches $V_1$ (FIG. 2), the magnet 16 stops adsorption of the stopper 30 through the comparator C. (The stopper 30 is adsorbed at the same time as the power source switch 17 is closed). By the release of adsorption of the stopper 30, the stopper 30 engages with the ratchet 20 of the stop-down ring 19 and stops rotation of the stop-down ring 19. The diaphragm value is determined by this action. As the diaphragm value is determined, a front screen or a fore-going ring of the shutter functions to start the exposure time. The function of the shutter front screen, etc. may be made by the third step pressing down of the shutter release bar or by the rotation of the stopper 30.

Next, the second example shall be explained.

While in the first example the amount of rotation of the stop-down ring is mechanically detected to effect change over of the switching device 1, in the second example a photocoupler is used to effect change over of the switch 1. 34 is an illuminating element such as a lamp, an illuminating diode, etc. which emits light when the power source switch 17 is closed, and in the drawing an illuminating diode is shown. 35 is a light receiving element such as a light receiving diode, a photo-resisting element which receives light from the illuminating element 34. A means (not shown in the drawing) is provided between the elements 34, 35 to intermittently shield the light from the illuminating element 34 corresponding to the variation in the diaphragm value of the diaphragm device. This means may be the gear 24 shown in FIG. 3, for example.

Now explanations shall be made on the case when said gear 24 is used. The illuminating element 34, the light receiving element 35 are positioned in front of and in rear of, respectively, the gear 24 so that the light is intermittently shielded by the teeth of the gear 24. By the rotation of the gear 24 the light of the illuminating element 34 is shielded as much as the amount of rotation of the stop-down ring 19 by the teeth of said gear 24. 36 is a transistor, to the base of which voltage is impressed when the light enters into the light receiving element 35. By this impressing of the voltage the transistor 36 is intermittently placed in a conductive state or non-conductive state, and the capacitors 2, 6 are intermittently charged. As the function thereafter is same as in the first example the explanation therefor is omitted. Now 37 is a resistor for manually setting photographing information.

Figure 5:
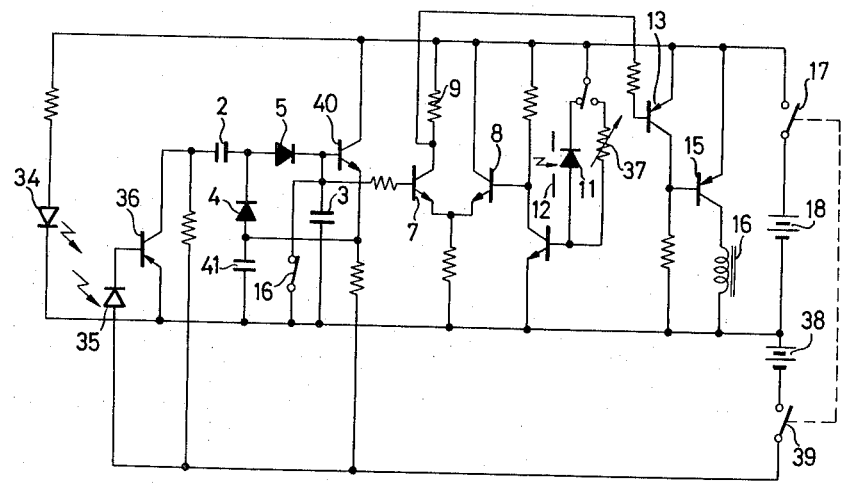
FIG. 5 is a circuit diagram showing a third example of the present invention.

FIG. 5 is a circuit diagram of the third example of the present invention. The device in the third example has a member generating a voltage signal which changes stepwise with equal intervals.

Figure 6:
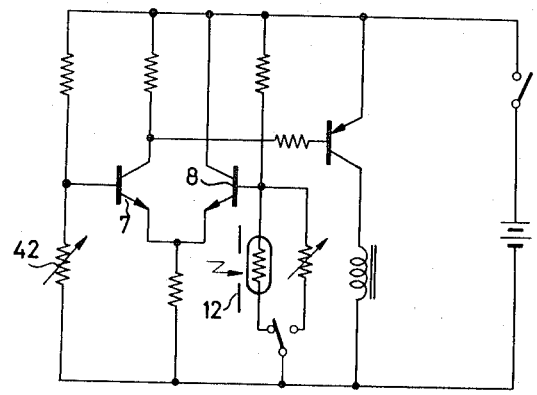
FIG. 6 is a circuit diagram showing a fourth example of the present invention.

38 is a second power source. 39 is a power source switch which is associated with the power source switch 17. When the transistor 36 is in an off-state the capacitor 2 is charged up to the voltage of the power sources 18, 38. When the transistor 36 is in on-state the capacitor 2 will have voltage of the power source 18. Said change or difference is charged to the capacitor 3. 40 is a transistor being connected to the terminal of the capacitor 3. By said transistor the capacitor 41 will have the terminal voltage of the capacitor 3. Since said voltage is impressed on the capacitor 2, by the switching of the transistor 36 the change or difference will be always charged at the capacitor 3. Therefore the variation of the terminal voltage of the capacitor 3 will be in stepwise made with equal intervals. FIG. 6 is to explain the fourth example of the present invention, wherein a variable resistor 42 which varies stepwise corresonding to the variation in the stop-down diameter is applied. The sliding piece of said variable resistor may be so composed that it moves intermittently when the stop-down ring 19 rotates by a predetermined angle.

What is claimed is:

1. An automatic diaphragm control device for a camera, comprising diaphragm control means for continuously changing the aperture of a diaphragm, stopping means coupleable to said diaphragm control means for stopping the aperture changing operation of the diaphragm control means, switching means responsive to said diaphragm control means for opening and closing repeatedly a number of times determined by the variation of the diaphragm value, storage means for storing and accumulating signals, signal generating means coupled to said switching means and said storage means for generating signals responsive to opening and closing of said switching means and for applying the signals intermittently to said storage means so that said storage means accumulates the signals and produces a stored value which varies stepwise corresponding to the variation of the aperture, reference generating means for generating a reference signal corresponding to a photographic value, comparator means coupled to said reference generating means and said storage means for comparing the value of the signal produced by said reference generating means and the signals stored in said storage means and for producing an output when the balance between the signals changes, and activating means coupled to said comparator means and said stopping means for activating the stopping means in response to changing of the balance in said comparator means.

2. A device as in claim 1, wherein said diaphragm control means includes a movable mechanical member and wherein said switching means includes a switch-over contact coupled to said movable member and switching back and forth repeatedly in response to movement of said mechanical member.

3. A device as in claim 1, wherein said storage means includes a capacitor and wherein said signal generating means responds to opening and closing of said switching means by intermittently applying a voltage to said capacitor and preventing the voltage from leaking off and then applying the next voltage so that the voltage across the capacitor builds up in steps.

4. A device as in claim 3, wherein said diaphragm control means includes a movable mechanical member and wherein said switching means includes a switch-over contact coupled to said movable member and switching back and forth repeatedly in response to movement of said mechanical member.

5. A device as in claim 3, wherein said signal generating means includes diode means for applying the signals to the capacitor and preventing them from leaking off.

6. A device as in claim 1, wherein said switching means includes a first illuminating element and a light receiving element, and shielding means movable with said control means and also forming a part of said control means for intermittently shielding the light from the illuminating means according to the variation in the change of diaphragm value.

7. A device as in claim 6, wherein said control means includes a gear having teeth and said shielding means includes a part of said gear.

8. A device as in claim 6, wherein said storage means includes a capacitor and wherein said signal generating means responds to opening and closing of said switching means by intermittently applying a voltage to said capacitor and preventing the voltage from leaking off and then applying the next voltage so that the voltage across the capacitor builds up in steps.

9. A device as in claim 8, wherein said diaphragm control means includes a movable mechanical member and wherein said switching means includes a switch-over contact coupled to said movable member and switching back and forth repeatedly in response to movement of said mechanical member.

* * * * *